United States Patent
Kluge et al.

(10) Patent No.: US 9,719,378 B2
(45) Date of Patent: Aug. 1, 2017

(54) METHOD AND APPARATUS FOR CONTROLLING MOISTURE SEPARATOR REHEATER

(71) Applicant: General Electric Company, Schenectady, NY (US)

(72) Inventors: Steven Craig Kluge, Burnt Hills, NY (US); Michael James Molitor, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 795 days.

(21) Appl. No.: 13/934,151

(22) Filed: Jul. 2, 2013

(65) Prior Publication Data

US 2013/0333386 A1 Dec. 19, 2013

Related U.S. Application Data

(63) Continuation of application No. 12/555,738, filed on Sep. 8, 2009, now Pat. No. 8,499,561.

(51) Int. Cl.
| | | |
|---|---|---|
| F01K 7/34 | (2006.01) | |
| F01K 3/18 | (2006.01) | |
| F01K 7/22 | (2006.01) | |
| F01K 13/02 | (2006.01) | |

(52) U.S. Cl.
CPC ............ *F01K 3/18* (2013.01); *F01K 3/181* (2013.01); *F01K 7/223* (2013.01); *F01K 13/02* (2013.01)

(58) Field of Classification Search
CPC . Y02E 20/18; F01K 3/22; F01K 3/267; F01K 7/22; F01K 7/24; F01K 7/32; F01K 7/40; F01K 7/44; F01K 20/18; F01K 23/106; F01K 25/08; F01K 25/10

USPC .......... 60/646, 653, 663, 677, 678, 679, 685
See application file for complete search history.

(56) References Cited

U.S. PATENT DOCUMENTS

| | | | |
|---|---|---|---|
| 3,574,303 | A | 4/1971 | Rabas |
| 3,766,732 | A | 10/1973 | Woodcock |
| 3,916,445 | A | 10/1975 | Alliston et al. |
| 3,996,897 | A | 12/1976 | Herzog |

(Continued)

FOREIGN PATENT DOCUMENTS

| | | |
|---|---|---|
| CA | 2481522 A1 | 4/2006 |
| EP | 2015312 A2 | 1/2009 |

(Continued)

OTHER PUBLICATIONS

Unofficial English translation of Office Action issued in connection with corresponding JP Application No. 2010-187746 on Mar. 11, 2014.

(Continued)

*Primary Examiner* — Kenneth Bomberg
*Assistant Examiner* — Daniel Wagnitz
(74) *Attorney, Agent, or Firm* — Fletcher Yoder, P.C.

(57) ABSTRACT

A system and a method are provided that may be used to control the temperature of steam being reheated by a moisture separator reheater (MSR). One embodiment provides a system including a steam turbine, a moisture separator reheater coupled to the steam turbine, and a controller programmed to control a temperature of steam leaving the moisture separator reheater based at least in part on sensor feedback. The controller is programmed to facilitate substantially smooth linear temperature ramping.

11 Claims, 6 Drawing Sheets

(56) References Cited

U.S. PATENT DOCUMENTS

| | | |
|---|---|---|
| 4,016,835 A | 4/1977 | Yarden et al. |
| 4,106,559 A | 8/1978 | Ritland et al. |
| 4,149,386 A | 4/1979 | Luongo et al. |
| 4,206,802 A | 6/1980 | Reed et al. |
| 4,220,194 A | 9/1980 | Shade et al. |
| 4,223,722 A | 9/1980 | Shade |
| RE30,589 E | 4/1981 | Park |
| 4,300,481 A | 11/1981 | Fisk |
| 4,302,227 A | 11/1981 | Miller |
| 4,374,666 A | 2/1983 | Devine |
| 4,386,583 A | 6/1983 | Rabas |
| 4,408,709 A | 10/1983 | Devine |
| 4,485,069 A | 11/1984 | Byerley |
| 4,530,814 A | 7/1985 | Schluderberg |
| 4,561,255 A | 12/1985 | Silvestri |
| 4,593,526 A | 6/1986 | Pankowiecki |
| 4,622,819 A | 11/1986 | Draper et al. |
| 4,685,511 A | 8/1987 | Sabatino |
| 4,688,385 A | 8/1987 | Shibashita et al. |
| 4,714,054 A | 12/1987 | Minard et al. |
| 4,768,585 A | 9/1988 | Hayes et al. |
| 4,840,766 A | 6/1989 | Nakamura et al. |
| 4,856,461 A | 8/1989 | Hayes |
| 4,905,631 A | 3/1990 | Hayes |
| 5,079,922 A | 1/1992 | Viscovich et al. |
| 5,457,721 A | 10/1995 | Tsiklauri et al. |
| 5,526,386 A | 6/1996 | Tsiklauri et al. |
| 5,793,831 A | 8/1998 | Tsiklauri et al. |
| 6,896,042 B2 | 5/2005 | Inoue et al. |
| 2007/0023536 A1* | 2/2007 | Baston ................ 236/44 C |

FOREIGN PATENT DOCUMENTS

| | | |
|---|---|---|
| JP | 5362001 A | 6/1978 |
| JP | 5890303 U | 6/1983 |
| JP | 5977205 A | 5/1984 |
| JP | 59224406 A | 12/1984 |
| JP | 60196504 A | 10/1985 |
| JP | 6291706 A | 4/1987 |
| JP | 63169409 A | 7/1988 |
| JP | 0692808 B2 | 11/1994 |
| JP | 2006083731 A | 3/2006 |

OTHER PUBLICATIONS

Unofficial English translation of Office Action issued in connection with corresponding JP Application No. 2010-187746 on Dec. 2, 2014.

Unofficial English translation of CN Office Action dated Jan. 22, 2014, issued in connection with corresponding CN Application No. 201010286890.9.

Extended European Search Report for EP Application No. 10175355.6 Mailed Jun. 7, 2016; 7 Pages.

* cited by examiner

METHOD AND APPARATUS FOR CONTROLLING MOISTURE SEPARATOR REHEATER

CROSS-REFERENCE TO RELATED APPLICATION

This application is a continuation of U.S. patent application Ser. No. 12/555,738, filed on Sep. 8, 2009, which is hereby incorporated by reference in its entirety.

BACKGROUND

The present invention relates to systems and methods for controlling a moisture separator reheater, for example, in power generation system using a steam turbine.

A variety of systems, such as power generation systems, utilize a moisture separator reheater (MSR) to dry and reheat a steam supply. For example, the MSR may dry and reheat steam in a steam turbine system that drives an electrical generator. In particular, the MSR may dry and reheat steam exhausted from a high pressure (HP) steam turbine, and then deliver the dried, reheated steam into a low pressure (LP) steam turbine. The steam turbine system may acquire HP steam from a suitable source, such as a boiler heated by a nuclear reactor or combustion of a fuel-air mixture. The amount of heat transfer and moisture removal by the MSR may affect overall performance of the steam turbine system, as well as the power generation system. The MSR generally includes a pneumatic controller responsive to a single control variable, i.e., the turbine pressure, indicative of turbine loading. Unfortunately, using a single variable, open loop control system results in sub-optimal performance and higher operating costs, because the turbine loading relates only indirectly to the MSR reheat process being controlled.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller capable of controlling a temperature of an MSR through the use of a temperature feedback.

In a second embodiment, a system includes a closed-loop controller capable of controlling the temperature of steam reheated by an MSR through the use of a temperature feedback.

In a third embodiment, a method includes sensing the temperature of the steam being reheated by an MSR and controlling the reheating of the steam by using a closed-loop control based at least in part on the sensed temperature.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
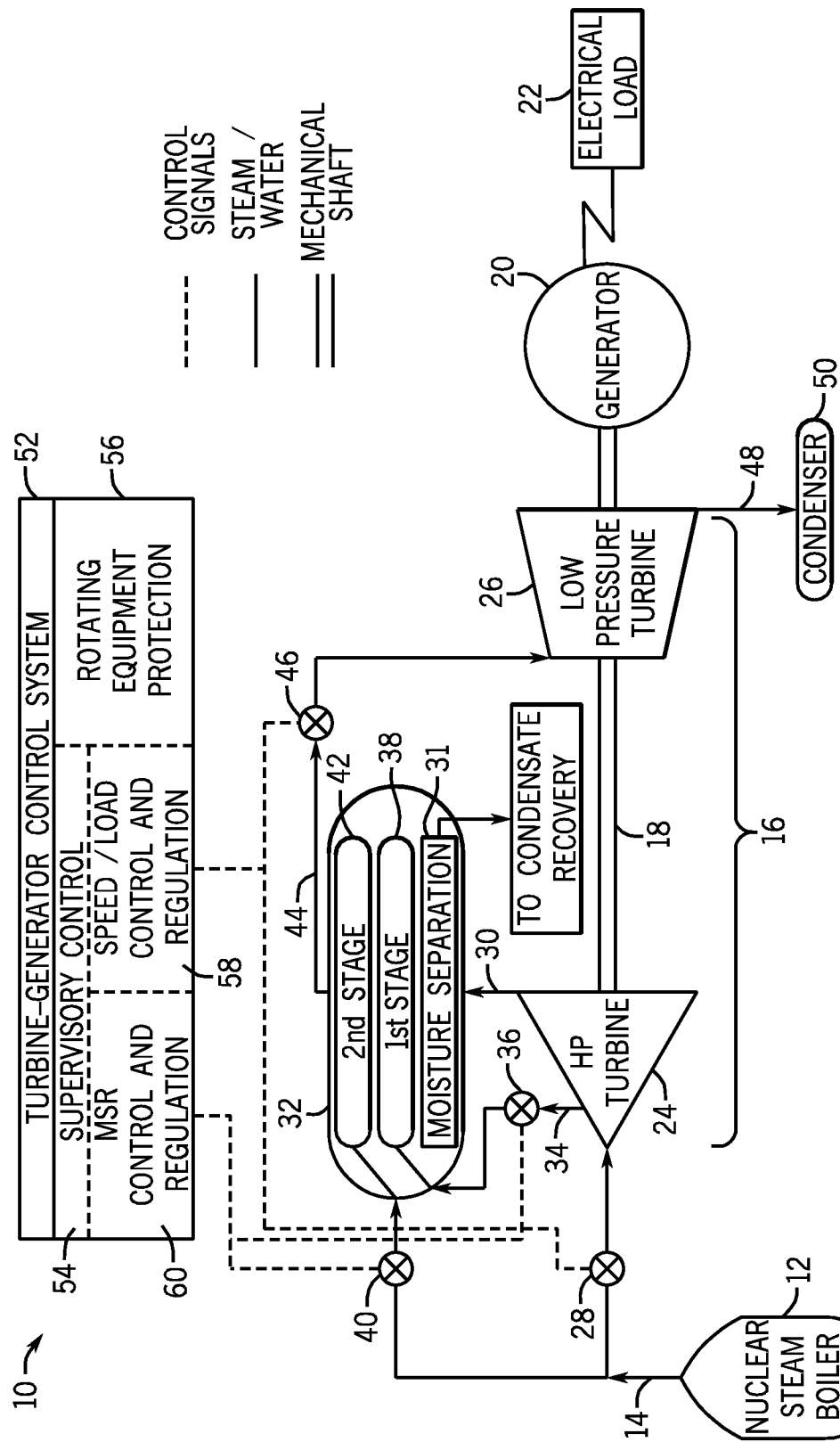
FIG. 1 is a diagram of an embodiment of a nuclear power plant.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for controlling a moisture separator reheater (MSR) based on temperature feedback and/or multiple feedback parameters. MSRs may be used in industrial processes, particularly in nuclear power plants, that operate wet steam turbines. In such plants, saturated or near saturated steam produced by a boiler may be used to power a high pressure (HP) turbine and may also be used by a plurality of MSRs to reheat an exhaust steam from the HP turbine. More specifically, an MSR may contain two reheater stages for use in reheating the exhaust steam from the HP turbine. The reheated exhaust steam may then be routed into a low pressure (LP) turbine and used as the LP steam that drives the LP turbine. The MSR's first stage reheater may be supplied with an extraction (bleed) steam from the HP turbine, and the MSR's second stage reheater may be supplied a main steam, i.e. the steam produced by the boiler. The two MSR reheater stages may then reheat the exhaust steam leaving the HP turbine and feed the reheated exhaust steam into a LP turbine as LP superheated steam. The MSR may increase the overall energy efficiency of the plant by removing excess moisture from the HP exhaust and by improving the thermal characteristics of the reheated LP steam (i.e., a LP steam with optimal temperature and pressure for use in rotating the LP turbine).

Unfortunately, a control system based solely on a turbine pressure indicative of turbine load does not provide an accurate control of the reheat temperature of the MSR. In particular, a non-linear relationship exists between a reheat temperature of the MSR and a valve position of steam being supplied to the MSR. As a result, a linear increase in pressure causes inaccurate control of the MSR due to the non-linear relationship. Furthermore, a control system based solely on turbine pressure ignores a variety of variables that may impact operation of the MSR and the entire system.

As discussed in further detail below, the disclosed embodiments include a controller, control logic, and various control techniques to improve operation of the MSR based on multiple feedback parameters, such as temperature, pressure, vibration, fluid flow rate, clearance, valve position, or any combination thereof. Furthermore, the disclosed embodiments may include a digital control system coupled to multiple sensors and actuators (e.g., valves), which are distributed throughout the system at multiple locations. The sensors may be configured to supply electronic feedback signals, while the actuators may be responsive to electronic control signals. Alternatively, the sensors and actuators may operate with analog signals. The actuators (e.g., valves) may control the flow of steam to the steam turbine stages, the MSR stages, and so forth. For example, the digital control system may be a distributed, closed-loop control system configured to control the second stage reheater of one or more MSRs.

FIG. 1 is a diagram of an embodiment of a power plant 10 having a nuclear steam boiler 12 as a main steam source 14. Alternatively, the main steam 14 may be produced by, for example, a fossil fuel-powered boiler 12. The main steam 14 is supplied to a main turbine 16, which uses the main steam 14 to rotate a turbine shaft 18. An electrical generator 20 converts the mechanical rotation of the turbine shaft 18 into electricity, which may then be used to power an electrical load 22, e.g., a power grid.

In certain embodiments, the main turbine 16 includes one or more high pressure (HP) turbines 24 and one or more low pressure (LP) turbines 26. Other embodiments may also include one or more intermediate pressure (IP) turbines. In the illustrated embodiment of FIG. 1, a single HP turbine and a single LP turbine is used by the power plant 10. The main steam 14 produced by the boiler 12 may be directed to the HP turbine 24 through a control and stop valve 28. The main steam 14 flows through the HP turbine 24, thereby driving a plurality of turbine blades to rotate the shaft 18. The steam expands and increases in moisture content through the HP turbine 24, and exits as an exhaust steam 30. The exhaust steam 30 from the HP turbine's exhaust may still contain usable energy. However, the exhaust steam 30 may also contain excessive moisture, in some cases upwards of 25% water. An MSR 32 may remove the moisture from the exhaust steam 30 by using moisture separation embodiments 31 and may reheat the exhaust steam 30 so that it may be more efficiently used by the low pressure turbine 26.

The reheating system of the MSR 32 may include at least two stages of heat exchange. Extraction steam 34 may be directed from the HP turbine 24 through a reheat steam control and stop valve 36 and used to feed a first stage reheater 38 (e.g., heat exchanger) of the MSR 32. For example, the extraction steam 34 may pass through (e.g., internal to) tubes of a fin and tube heat exchanger 38, while the exhaust steam 30 flows around (e.g., external to) the heat exchanger 38, thereby transferring heat from the extraction steam 34 to the exhaust steam 30. Main steam 14 may be directed from the boiler 12 through a reheat steam control and stop valve 40 and used to supply a second stage reheater 42 (e.g., heat exchanger) of the MSR 32. For example, the main steam 14 may pass through (e.g., internal to) tubes of a fin and tube heat exchanger 42, while the exhaust steam 30 flows around (e.g., external to) the heat exchanger 42, thereby transferring heat from the main steam 14 to the exhaust steam 30. Superheated steam 44 heated through the use of the first stage reheater 38 and the second stage reheater 42 may then exit the MSR's 32 outlets and be directed into the inlets of the LP turbine 26 through a turbine reheat steam control and stop valve 46. The LP turbine 26 may then convert the thermal energy in the reheated exhaust steam 44 into mechanical energy, which may be used to rotate the turbine shaft 18. A LP turbine exhaust steam 48 may then be directed into a condenser 50 in order to recover water for use in other plant components (e.g., as feedwater). Accordingly, the MSR 32 reheating system may be used to improve the performance and reliability of the LP turbine 26 by providing thermally efficient steam (i.e., steam that enters the LP turbine at a temperature and pressure optimal for conversion into rotational energy).

As further illustrated in FIG. 1, the system 10 includes an exemplary embodiment of a turbine-generator control system 52. In certain embodiments, the control system 52 may be a digital control system or computer-implemented control system using electronic sensor feedback and electronic actuators (e.g., valves). The turbine generator control system 52 may manage the various main turbine 16 systems, the generator 20 systems, and related components (e.g., the MSR 32, valves 28, 36, 40, and 46) so as to operate the systems and components in a safe and efficient manner. The turbine-generator control system 52 may be subdivided into multiple sub-control systems, e.g., a supervisory control system 54 and a rotating equipment protection system 56. The supervisory control system 54 may control the operation of the main turbine 16 systems and related components along with the generator 20 so that the generator 20 may optimally generate electricity at a frequency (e.g., 60 Hz) adequate to power the electrical load 22. The rotating equipment protection system 56 may oversee the various plant systems related to rotational equipment (e.g., the turbine shaft 18) and ensure that the systems stay within safe operational parameters.

The supervisory control system 54 may be further subdivided into multiple sub-control systems, e.g., a speed/load control and regulation system 58 and an MSR control and regulation system 60. The speed/load control and regulation system 58 may control the speed and the loading of the main turbine 16 to control thermal gradients, clearance, stresses, and performance of the turbine 16, as well as to generate the desired electricity based on demands. For example, the regulation system 58 may increase or decrease the speed of the turbine 16 based on electrical demand, adjust clearance based on steady state or transient conditions, and so forth. In other words, the speed/load control and regulation system 58 may provide a suitable match between the speed and loading of the turbines 24 and 26, so that the turbines 24 and 26 stay within their operational parameters while minimizing fuel consumption and providing sufficient electricity to meet the demands. As discussed in further detail below, the MSR control and regulation system 60 may manage the reheating stages 38 and 42 of the MSR 32 using multiple feedback signals, e.g., temperature, pressure, vibration, clearance, moisture content, valve position, shaft speed, load, fluid flow rate, or any combination thereof.

Figure 2:
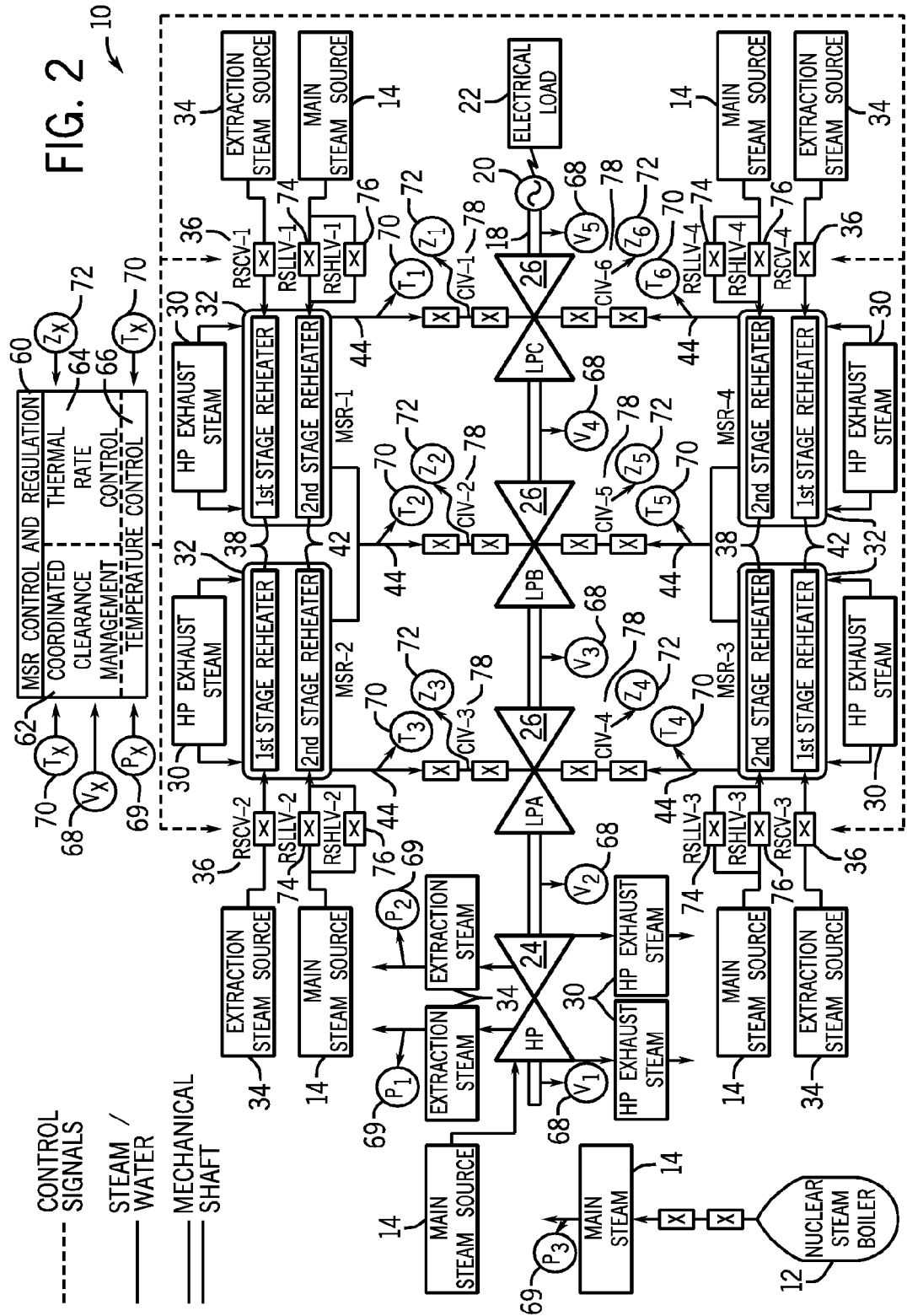
FIG. 2 is a diagram of an embodiment of a MSR control and regulation system to control first and second reheater stages of a plurality of MSRs.

FIG. 2 is a diagram of an embodiment of the MSR control and regulation system 60 that may be used to control the reheating stages of a plurality of MSRs 32. As discussed in detail below, the system 60 is a digital closed-loop control system that adjusts actuators (e.g., valves) based on a variety of sensors feedback, including temperature feedback. For example, the system 60 may be responsive to electronic sensor feedback signals indicative of temperature, pressure, vibration, clearance, rotational speed, fluid flow rate, valve position, load, and so forth. There are several modes of turbine operation (e.g., loading, unloading, trip, auto shutdown, and parasitic loss control) that use specific control of the steam fed into a MSR 32. Accordingly, the MSR control and regulation system 60 may use certain controller embodiments to properly and efficiently control the steam fed into the two reheater stages of a MSR 32 as described in more detail with respect to FIGS. 3, 4, 5 and 6 below. In the embodiment of FIG. 2, the MSR control and regulation system 60 is used in the power plant 10, which includes one double-flow HP turbine 24, three double-flow LP turbines 26, and four MSRs 32. The MSR control and regulation system 60 may include three subsystems, a coordinated clearance management system 62, a thermal rate control system 64, and a temperature control system 66.

The coordinated clearance management system 62 may be used to process vibration data sensed by a set of vibration sensors Vx 68 (e.g., V1, V2, V3, V4, and V5) and temperature data sensed by a set of temperature sensors Tx 70 (e.g., T1, T2, T3, T4, T5, and T6) in order to actively adjust clearance between the rotating and stationary components of the LP turbines 26, in order to, for example, prevent clearance rubs. The thermal rate control system 64 may be used to process valve position data sensed by a set of valve position sensors Zx 72 (e.g., Z1, Z2, Z3, Z4, Z5, and Z6) in order to actively adjust the thermal rate and the loading of the LP turbines 26, in order to, for example, follow the thermal requirements of various modes of MSR operation (e.g., loading, unloading, trip, auto shutdown, parasitic loss control). The temperature control system 66 may be used by both the coordinated clearance management system 62 and the thermal rate control system 64 to control the temperature of the second stage of an MSR 32 by actively adjusting the position of a reheating steam low load valve (RSLLV) 74 and a reheating steam high load valve (RSHLV) 76 of each of the four MSRs 32. The temperature control system 66 may also process data sensed by the set of temperature sensors Tx 70 (e.g., T1, T2, T3, T4, T5, and T6) and pressure/loading sensors Px 69 (e.g., P1, P2, and P3) and use certain controller embodiments described in more detail with respect to FIG. 3 below to control the reheating of the steam that will be directed into the LP turbine 26.

It is to be understood that sensors Vx 68, Px 69, Tx 70 and Zx 72 may be found throughout the power supply plant 10 and are not limited to those shown in FIG. 2. Other sensors not shown include speed sensors, clearance sensors, and flow sensors. Many of the sensors may be reused from other control applications. For example, the speed/load control and regulation system 58 of FIG. 1 may include a set of rotary speed sensors that may be affixed to various points on the turbine shaft to measure the turbine speed. The rotating equipment protection system 56 may include clearance sensors affixed to the turbine shroud and used to measure, for example, rubs between the shaft and the shroud. Flow sensors may be affixed to supply lines and used to measure the volume of steam flowing through the lines. Temperature sensors may include thermocouples, thermistors, resistance temperature detectors (RTDs), bimetallic, infrared, and others. Vibration sensors may include accelerometer sensors, displacement sensors, velocity sensors, or a combination thereof. Pressure sensors may include strain gauges, diaphragm sensors, load cells, differential pressure transducers, and others. Valve position sensors may include inductive position sensors, rotary encoder sensors, proximity sensors, limit switches, and others.

As mentioned above with respect to FIG. 1, each MSR 32 includes a first stage reheater 38 and a second stage reheater 42 that may be controlled to reheat the exhaust steam 30 from the HP turbine 24. Both reheater stages 38 and 42 may be interlocked such that the second stage 42 may not operate unless the first stage 38 of the MSR is also in service. The first stage reheater 38 may be controlled by controlling the extraction steam 34. Extraction steam 34 coming from the HP turbine 24 may be directed into the first stage reheater 38 through the reheating steam control valve (RSCV) 36. In certain embodiments, the RSCV 36 is an open/close check valve. The flow of extraction steam 34 through the RSCV 36 varies according to the loading of the extraction steam 34 source, i.e., the HP turbine 24. As appreciated, a reduction in flow of the extraction steam 34 results in a reduction of heat transfer to the exhaust steam 30, while an increase in flow of the extraction steam 34 results in an increase in heat transfer to the exhaust steam 30. In certain embodiments, the RSCV 36 valve may be left fully open as soon as the turbine shaft 18 reaches a rated speed. Extraction steam 34 entering the first stage reheater 38 from the HP turbine 24 may then vary proportional to the loading of the HP turbine 24.

The second stage reheater 42 may be controlled by controlling the main steam 14. Main steam 14 coming from the boiler 12 may be directed into the second stage reheater 42 through two valves, a RSLLV 74 and a RSHLV 76. The RSHLV 76 is connected in parallel with the RSLLV 74 and may be opened at higher loads in order to reduce parasitic pressure drop across the RSLLV 74. The RSLLV 74 may be opened and closed (i.e., modulated) by a closed-loop controller as described in more detail with respect to FIG. 3 below. The operation of the RSCV 36, RSLLV 74 and RSHLV 76 controls the flow of extraction steam 34 entering the first stage reheater 38 and the flow of main steam entering the second stage reheater 42, thereby controlling the heat transfer to the HP exhaust steam 30. The thermally enhanced steam 44 may then be directed downstream into the LP turbine 26 through a combined intermediate valve (CIV) 78. The LP steam may then be converted into mechanical energy by the LP turbine 26 and used to rotate the turbine shaft 18. The rotating shaft 18 may then be used by the generator 20 to generate electricity for distribution to an electrical load 22.

Figure 3:
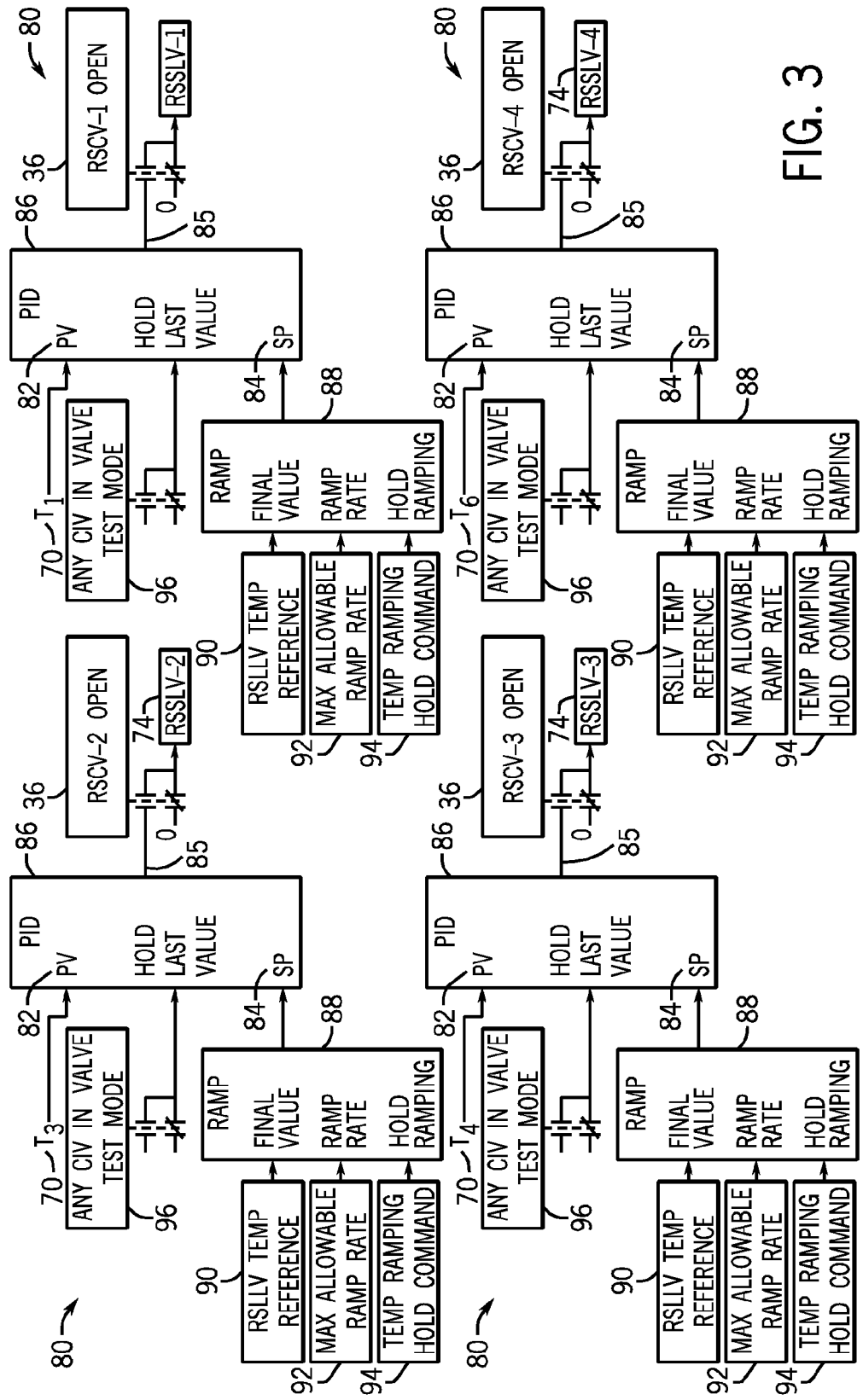
FIG. 3 is a diagram of an embodiment of a plurality of PID controllers each configured to control a valve of a second stage reheater of a MSR.

FIG. 3 is a diagram of an embodiment of a set of proportional integral derivative (PID) controllers 80 that may be used to control the RSSLV 74. More specifically, the MSR control and regulation system 60 may include a set of the PID controllers 80 such as those depicted in FIG. 3 and use the PID controllers 80 to modulate (i.e., incrementally open and close) a RSSLV 74. Each PID controller 80 controls a separate MSR 32. That is, the four PID controllers 80 depicted in FIG. 3 are capable of operating the four RSSLV 74 depicted in FIG. 2. Each one of the PID controllers 80 controls the valve position of a RSSLV 74 that allows main steam 14 to enter the second stage reheater 42 of the MSR 32. For example, the PID controller 80 driving the RSSLV-1 74 controls the exhaust steam entering the second stage reheater 42 of the MSR-1 connected to the RSSLV-1 74 of FIG. 2. Similarly, the PID controller 80 driving the RSSLV-2 74 controls the exhaust steam 30 entering the second stage reheater 42 of the MSR-2 connected to the RSSLV-2 74. The PID controller 80 driving the RSSLV-3 74 controls the exhaust steam 30 entering the second stage reheater 42 of the MSR-3 connected to the RSSLV-3 74 and the PID controller 80 driving the RSSLV-4 74 controls the exhaust steam 30 entering the second stage reheater 42 of the MSR-4 connected to the RSSLV-2 74.

The PID controller 80 embodiments depicted in FIG. 3 may use an outlet temperature sensed by the temperature sensor Tx 70 as the process value (PV) 82 input. A temperature reference setpoint (SP) 84 may be calculated using embodiments described in more detail with respect to FIGS. 5 and 6. A PID control block 86 may use proportional integral derivative techniques to define a closed-loop temperature control based on the reheat temperature feedback given by the temperature sensor Tx 70 and the temperature reference setpoint 84. In one embodiment, the output o 85 of the PID control block 86 may be calculated using the equation below:

$$o = P[(PV-SP) + I \int (PV-SP) + D(dPV/dt)]$$

In the equation above, P is the proportional gain, I is the integral gain, and D is the derivative gain that may be used by the PID control block 86 when calculating the next output o 85 based on the current input variables PV 82 and SP 84. The gains P, I, and D may be derived for specific installations of the second stage reheater 42 by using suitable PID tuning techniques, for example, the Ziegler-Nichols method, the Cohen-Coon method, manual tuning, and/or by using software tools developed for PID tuning. An operator may tune the PID controller 80 for a specific second stage reheater 42 installation in order to arrive at specific gains P, I, and D.

The PID control block 86 may be constantly updating, that is, receiving the input setpoint 84 and feedback from the temperature sensor Tx 70 (i.e., as process value 82) and may be using the equation above to derive a new output o 85. The output o 85 may then be used to modify the valve position of the RSSLV 74. This process of receiving new inputs (e.g., process value 82, setpoint 84) and determining an output o 85 repeats cyclically very quickly, in some embodiments, every few computing cycles of a microprocessor. The output o 85 may then be used to adjust the RSSLV 74 position accordingly. By constantly adjusting, i.e., modulating, the position of the RSSLV 74, the PID controller 80 may control the precise volume of steam entering the second stage reheater 42 of the MSR 32 so that the MSR 32 may optimally reheat a HP exhaust steam 30.

Figure 4:
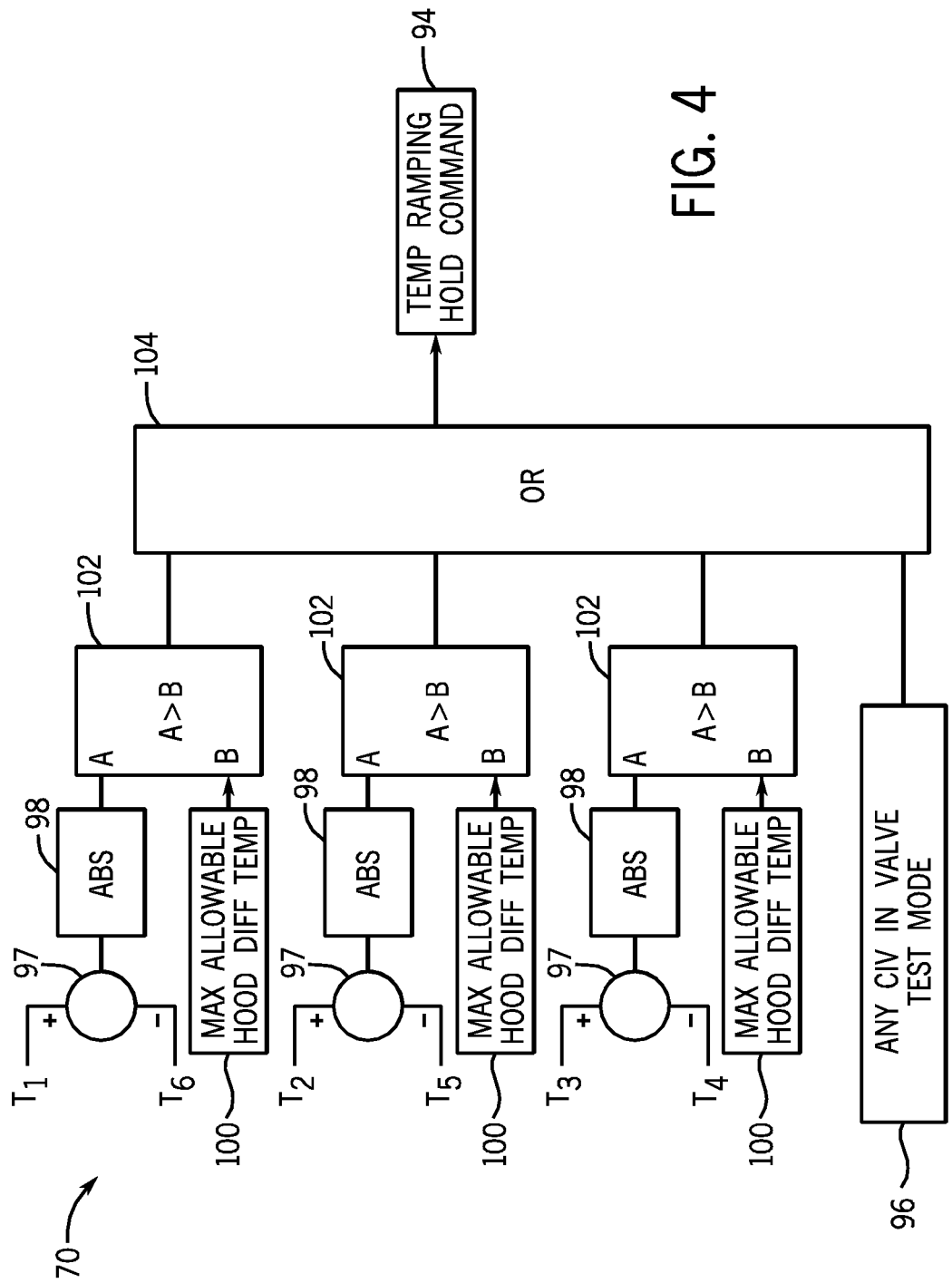
FIG. 4 is a flowchart of an embodiment of control logic configured to determine whether to issue a temperature ramping hold command.

In the illustrated embodiment of FIG. 3, the controller 80 also includes a ramp control block 88 that may be used to derive the new setpoint 84. The ramp control block 88 may derive the new setpoint 84 by ramping up or down a given amount from the previous setpoint 84. This ramping up or down from the previous setpoint 84 may be used to prevent excessive changes in the setpoint 84 that may lead to thermal distortions and inefficiencies. Accordingly, the new setpoint 84 may only be allowed to vary, for example, by approximately 10, 20, 30, 40, or 50° F. from the previous setpoint 84. In one embodiment, the ramp control block 88 may have three input variables, a RSLLV temperature reference 90, a maximum allowable ramp rate 92, and a temperature ramping hold command 94. In one embodiment, the RSSLV temperature reference 90 may be derived by using a function F (L, T, V, Z) as described in more detail with respect to FIGS. 5 and 6 below. In another embodiment, the RSSLV temperature reference 90 may be derived by using a RSSLV temperature reference axis (ordinate axis) of a temperature loading model as described in more detail with respect to FIGS. 5 and 6 below. The maximum allowable ramp rate 92 may be a constant that determines an upper value ramping rate for safely operating the MSR 32, derived, for example, by respecting the thermal limitations of specific MSR embodiments. The temperature ramping hold command 94 is used to hold, i.e. maintain, the same value for the time interval, the temperature setpoint 84. As discussed further below, FIG. 4 is a flowchart of an embodiment of a process that may be used to derive when to issue the temperature ramping hold command 94.

Continuing with FIG. 3, the ramp control block 88 may first determine whether or not the temperature ramping hold command 94 has been set. If a temperature ramping hold command 94 has been set, then the ramp control block 88 maintains the temperature setpoint 84 at its current value. The temperature setpoint 84 may stay at the same hold value for as long as the temperature ramping hold command 94 is set. If no temperature ramping hold command 94 has been set, then the ramp control block 88 may calculate a new RSLLV temperature reference value 90 by using the embodiments of FIGS. 5 and 6 described below, e.g., as a function F (L, T, V, Z) or a RSSLV temperature reference axis of a temperature loading model.

When ramping up, i.e., when the newly calculated RSLLV temperature reference value 90 is greater than the existing setpoint 84, the ramp control block 88 may check whether the newly calculated RSLLV temperature reference value 90 is greater than the existing temperature setpoint 84 by a maximum allowable ramp rate 92 amount (i.e., if the newly calculated RSLLV temperature reference value 90≤setpoint value 84+maximum ramp rate value 92). If the newly calculated RSLLV temperature reference value 90 is not greater than the existing temperature setpoint 84 by a maximum allowable ramp rate 92 amount, then the newly calculated RSLLV temperature reference 90 value may be used as the new temperature setpoint 84. If the newly calculated RSLLV temperature reference 90 value is greater than the existing temperature setpoint 84 by a maximum allowable ramp rate 92 amount (i.e., if the newly calculated RSLLV temperature reference value 90>setpoint value 84+maximum ramp rate value 92), then the new setpoint value 84 may be calculated by adding the old setpoint value 84 to the maximum allowable ramp rate 92 (i.e., old setpoint value 84+maximum allowable ramp rate 92).

Similar logic may be used by the ramp control block 88 to ramp down from a previous setpoint value 84, i.e., when the newly calculated RSLLV temperature reference value 90 is less than the previous setpoint value 84. If the newly calculated RSLLV temperature reference value 90 is not less than the existing temperature setpoint 84 by a maximum allowable ramp rate 92 amount (i.e., if the newly calculated RSLLV temperature reference value 90≥setpoint value 84−maximum ramp rate value 92), then the newly calculated RSLLV temperature reference 90 value may be used as the new temperature setpoint 84. If the newly calculated RSLLV temperature reference 90 value is less than the existing temperature setpoint 84 by a maximum allowable ramp rate 92 amount (i.e., if the newly calculated RSLLV temperature reference value 90<setpoint value 84−maximum ramp rate value 92), then the new setpoint value 84 may be calculated by subtracting the old setpoint value 84 to the maximum allowable ramp rate 92 (i.e., old setpoint value 84−maximum allowable ramp rate 92). Accordingly, the ramp control block may allow for incremental control (i.e., ramping up or down) over the setpoint 84 temperature, insuring that the MSR's stage reheater temperatures do not vary excessively and stay within safe operating limits.

The controller 80 also includes control logic that may be used for CIV 78 testing for the MSR 32, i.e., a valve test mode 96 of the CIV 78. In certain embodiments, the controller 80 periodically tests the CIVs 78 to ensure that they are working within their design parameters, that is, that the CIVs 78 can completely open and close. During testing, the CIVs 78 may be set to the valve test mode 96 and then intentionally moved to a fully closed position. The temperature setpoint 84 may be held during testing of CIVs 78 so that the valve test can occur without any unnecessary temperature transients in LP turbine 26 sections during or just after the valve test. Thus, a temperature ramping hold command 94 may be issued when the CIV 78 is in the valve test mode 96.

While the embodiment of FIG. 3 depicts the PID controller 80, it is to be understood that other embodiments may be used. For example, a programmable logic controller (PLC), a computer, an embedded system, and others may used in lieu of the PID controller 80 of FIG. 3. A combination of different controller types may also be used, that is, some of the control logic of the PID controllers 80 depicted in FIG. 3 may be embodied not only in PIDs 80, but also in PLCs, computers, embedded systems, and/or a combination thereof. It is also to be understood that controller 80 values such as the maximum allowable ramp rate 92 may be easily changed by simply entering a new value into the controller. The controller 80 may include a graphical user interface (GUI) to enter values, to reprogram existing functionality, to issue commands (e.g., temperature ramping hold command 94), and others.

FIG. 4 is a diagram of an embodiment of a process to derive the temperature ramping hold command 94 mentioned above. A process step 97 may first find the difference between two temperatures sensed by temperature sensors 70 positioned on opposite sides of a double-flow LP turbine 26 (shown in FIG. 2) and then find the absolute value of the difference between the two temperatures at step 98. For example, if the temperature sensors T1 and T6 are being used, the step 98 will calculate |T1-T6|. T1 and T6 may have been chosen because the two temperature sensors T1 and T6 are sensing temperatures from opposite sides of the same double-flow LP turbine LPC 26 (shown in FIG. 2). The reduction of side-to-side temperature differences is important in reducing the possibility of unwanted side-to-side shifting of the LP turbine LPC 26. In particular, side-to-side temperature differences can result in different thermal expansion from one side to another (i.e., side-to-side shifting), thereby causing differences in the clearances from one side to another. In turn, the variation in clearances from one side to another may result in unwanted effects such as vibration. In order to prevent such side-to-side shifting, the absolute value of the side-to-side temperature difference between two opposing temperature sensors 70, for example sensors T1 and T6, may be compared to a maximum allowable difference temperature 100 at a step 102. If the side-to-side temperature difference found at step 98 is larger than a maximum allowable difference temperature 100, or it is found that a CIV 78 is in the valve test mode 96, then a temperature ramping hold command 94 may be issued at step 104. Other side-to-side temperature differences calculated include the temperatures sensed by the sensor pair T2 and T5, and the sensor pair T3 and T4.

Should any of the side-to-side temperature differences calculated by using the sensor pairs, T1-T6, T2-T5, or T3-T4 result in a side-to-side temperature difference exceeding the maximum allowable difference temperature 100 or it is found that a CIV 78 is in the valve test mode 96, then the temperature hold command 94 resulting from step 104 may be communicated to the PID controllers 80. For example, if the side-to-side temperature difference sensed by the temperature sensor pair T3-T4 results in a temperature hold command 94, then the hold command 94 may be communicated to the PID controllers 80 that control valves RSSLV-2 and RSSLV-3 (shown in FIG. 3). Similarly, if any of the CIVs 78 is in the CIV valve test mode 96 then the temperature hold command 94 resulting from step 104 may be communicated to the appropriate PID controllers 80.

The PID controllers 80 may collaboratively act to reduce the possibility of temperature gradients. For example, the PID controllers may use the same temperature sensors and take appropriate control actions to reduce temperature differences. By minimizing the temperature differences, the controllers are able to reduce the possibility of temperature gradients causing variations in clearances. Less clearance variations will lead to less shifting and consequently, to the reduction of vibrations. Thus, the logic depicted in FIG. 4 prevents unwanted side-to-side temperature differences as well as allow for proper valve control during CIV 78 testing.

Figure 5:
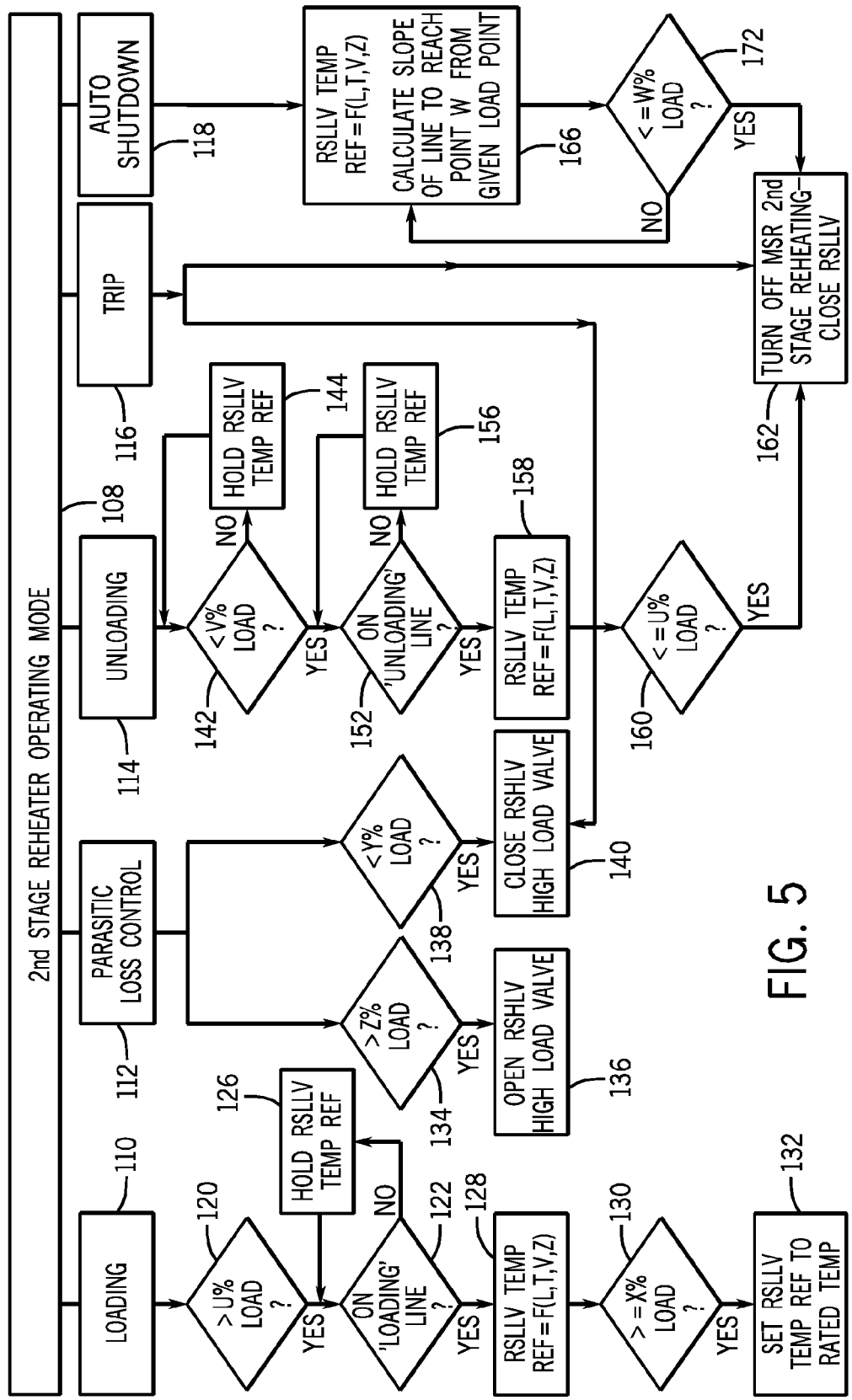
FIG. 5 is a flowchart of an embodiment of control logic that may be used in conjunction with FIG. 6 to operate a second stage reheater of a MSR.
Figure 6:
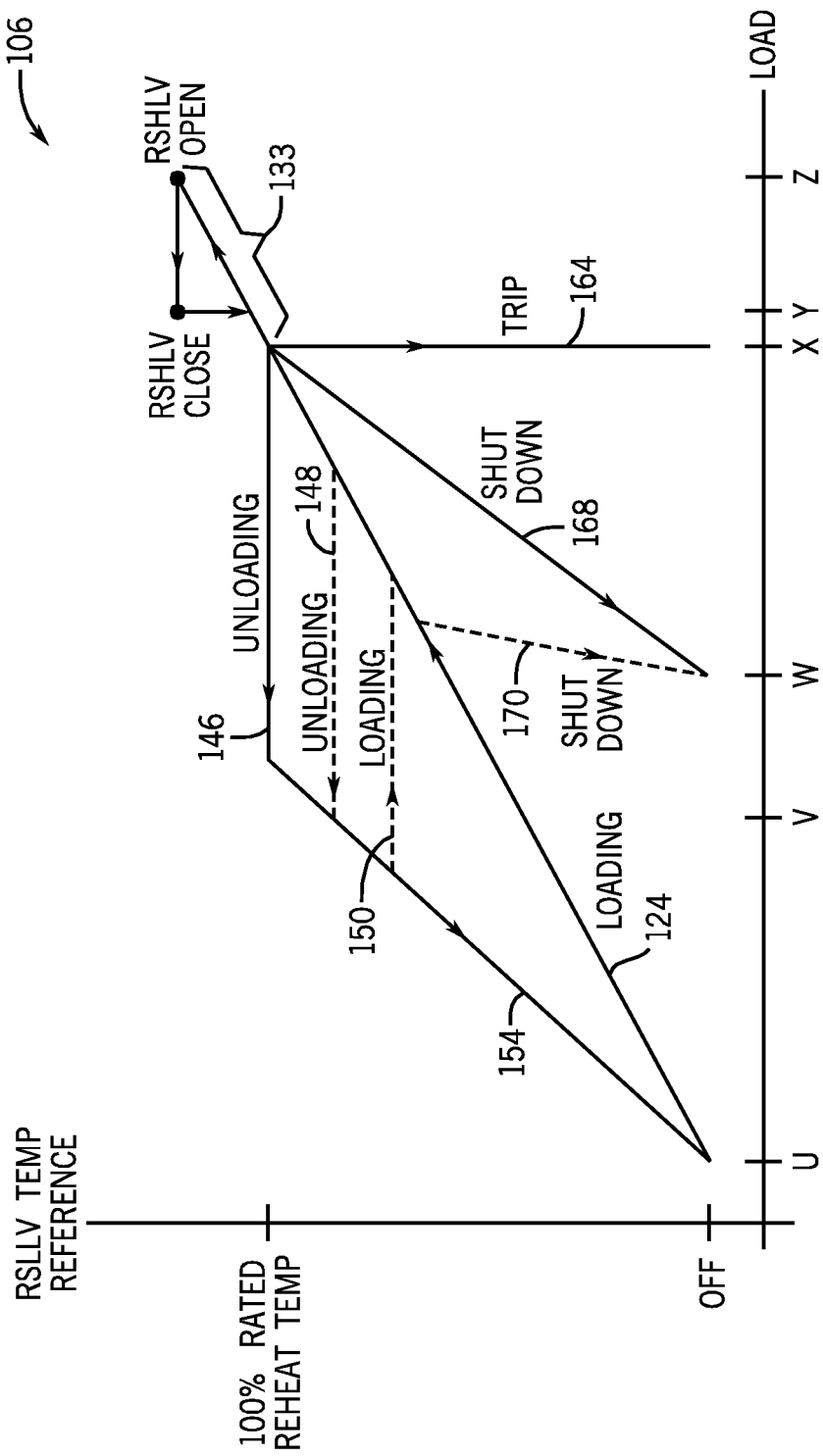
FIG. 6 is a graph of an embodiment of a temperature loading model that may be used in conjunction with FIG. 5 to operate a second stage reheater of a MSR.

FIG. 5 is a flow chart of an exemplary embodiment of control logic that may be used in conjunction with a temperature loading model 106 of FIG. 6 to control the second stage reheater 42 of the MSR 32 during various operating modes. As discussed above, the steam fed into the MSR 32 is increased or decreased in a controlled manner to improve performance and reduce the possibility of shock to the system. For example, there are several operating modes of the second stage reheater 42 that may utilize specific control logic for controlling the steam fed into the second stage reheater 42. Accordingly, a second stage reheater 42 operating mode control block 108 may be used to execute control logic for five operating modes of the second stage reheater 42. The five operating modes each have a control block as follows. A loading control block 110 may be used to control operations during loading, e.g., when there is an increase in main steam 14 being directed into the turbine system 16. A parasitic loss control block 112 may be used to control the loss of pressure when operating at high loads. An unloading control block 114 may be used to control operations during unloading, e.g., when there is a decrease in the main steam 14 being directed into the turbine system 16. A trip control block 116 may be used to control operations when there is a trip condition for a very rapid shutdown of the MSR 32. An auto shutdown control block 118 may be used to shut down the MSR 32 in a controlled manner, but not as rapid as the trip control block 116.

Returning to the loading control block 110, the control block 110 may use the loading model 106 of FIG. 6 to arrive at a RSSLV temperature reference value 90 that may then be used by closed-loop controller embodiments as described above in FIG. 3 to arrive at a temperature setpoint 84. In a decision 120, the current turbine load percentage is compared to load point U (abscissa) of the temperature loading model 106 of FIG. 6. If the current turbine load percentage is greater than load point U, then the control logic moves to decision 122. If the current turbine load is not greater than load point U, then no action may need to be taken. Traditionally, load point U has been chosen to be approximately 15% of the turbine loading. Accordingly, the MSR second stage reheater 42 has traditionally not been turned on until loading reaches 15%. However, by using the disclosed closed-loop control embodiments, the load point U need not be at 15% of loading anymore. Indeed, the load point U may be anywhere from approximately 15% to 50% of loading depending on factors such as turn-downs and outage needs. Further, the load point U may be updated and easily changed through the use of, for example, a GUI.

At decision block 122, the process evaluates whether the current operational state of the MSR is along a loading line 124 of MSR temperature versus load. For example, a point (a, b) represents the current operational state, wherein a represents the current turbine load percentage and b represents the current sensed temperature. If the current sensed temperature (e.g., second stage reheater 42 output temperature) is not on the loading line 124 of FIG. 6, then at step 126 the current RSLLV temperature reference value 90 is held, i.e., kept at the same value, and the control logic repeats decision 122. The loading line 124 of FIG. 6 represents an exemplary relationship between the current turbine loading percentage and the ideal temperature at the RSSLV. That is, the RSSLV temperature that should be used to reheat steam when the turbine loading is at a given %. Ideally, the point (a, b) tracks the loading line 124 during loading operations. Thus, if the point (a, b) is outside the loading line, then the RSSLV temperature reference 90 may be held while loading in order to allow the point (a, b) to return to the loading line 124. The point (a, b) need not be perfectly on the loading line 124 and in some embodiments the point (a, b) may be considered to be on the loading line 124 if the point (a, b) is within a certain tolerance of the loading line 124. For example, the tolerance may be plus or minus less than approximately 1, 2, 3, 4, or 5 percent of the temperature on the loading line, e.g., plus or minus 5, 10, 15, or 20 degrees Fahrenheit. In certain embodiments, the loading line 124 depicted in FIG. 6 may have a different slope or shape depending on factors including the type, manufacture, and material properties of the turbine and MSR components as well as the type of control desired (e.g., linear versus non-linear). Indeed, in some embodiments of the temperature loading model 106, the loading line 124 may be a curved path, such as an upwardly or downwardly sloping curve, or a series of linear paths having different slopes.

If the point (a, b) is disposed on (e.g., within tolerance of) the loading line 124 at decision block 122, then a step 128 computes a new RSSLV temperature reference value 90 by using the function F (L, V, T, Z). The function F (L, V, T, Z) is a transfer function of temperature reference based on load (L), vibration (V), rate-controlled reheating steam temperature (T), and valve position (Z). The function F (L, V, T, Z) may be derived based on the RSSLV temperature reference value 90 obtained by matching the current loading (L) of the loading line 124 of FIG. 6 to the ordinate (y-axis) of the temperature loading model 106 of FIG. 6, with constraints based on turbine hood side-to-side temperature difference to limit vibration (V), rate-controlled reheating steam temperature (T) to maintain component safety, with coordination between all temperature controllers depending on valves CIV position/testing (Z).

In another embodiment, the RSLLV temperature reference value 90 may be obtained by matching the current loading of the loading line 124 to the ordinate (y-axis) of the turbine loading model 106 and using the RSSLV temperature reference value 90 found on the ordinate. In other words, given the current loading percentage as a, the process may determine b (i.e., the RSSLV temperature reference value 90) such that the point (a, b) falls on the loading line 124. Once a RSSLV temperature reference value 90 has been determined at step 128, then the setpoint 84 of the PID controllers 80 may be updated to reflect the newly determined RSSLV temperature reference value 90 as described above with respect to FIG. 3.

Continuing with decision 130 of the loading control logic, if the current turbine load percentage is equal to or greater than load point X of the temperature loading model 106 of FIG. 6, then at step 132 the RSSLV temperature reference value 90 is set to the maximum rated reference temperature (i.e., 100% rated reheat temperature). Accordingly, the X point on the loading line 124 of the temperature loading model 106 corresponds to a loading point at which the temperature of the second stage reheater 42 steam is 100% of the rated reheat temperature. Traditionally, X has been set to approximately 65% of loading. However, by using the disclosed closed-loop control embodiments, the point X need not be at 65% of loading anymore. Indeed, the point X may now be chosen and updated, for example, by using a GUI, depending on factors such as turn-downs (e.g., anticipated shutdowns) and outage needs.

Returning to the parasitic loss control block 112, the control block is used to control situations in which the turbine 16 may be operating close to or over 100% rated reheat temperature and high loading, such as a portion 133 of the loading line 124 of FIG. 6. In this situation, the parasitic loss control block 112 logic may determine at decision block 134 if the turbine loading percentage is greater than load point Z of the temperature loading model 106. If the turbine loading percentage exceeds load point Z, then the RSHLV 76 is opened at step 136. The RSHLV 76 helps prevent a drop of pressure at high temperatures and turbine loadings by opening a second steam path in parallel with the first steam path created by using the RSLLV 74. If the parasitic loss control block 112 determines at decision 138 that the turbine load percentage has come down to less than the point Y of the temperature loading model 106, then the RSHLV 76 is closed at step 140. Thus, the parasitic loss control block 112 may be used to help alleviate or to prevent the parasitic loss of pressure at higher temperatures and turbine loadings.

Returning to the unloading control block 114, the control block is used to control the second steam reheater 42 during unloading operations. Unloading occurs when less main steam is directed into the turbine system. The unloading control logic at decision 142 determines if the current turbine load % is less than the loading point V of the temperature loading model 106 of FIG. 6. If the current turbine load % is not less than V % load, then the RSLLV temperature reference 90 is held at step 144 so that the unloading occurs along a horizontal line. For example, the RSLLV temperature reference value 90 may be held during unloading, resulting in a horizontal unloading line (e.g., unloading lines 146 and 148 of temperature loading model 106 of FIG. 6), to decouple MSR operations from normal load swings and also to prevent unwanted thermal effects. Accordingly, a certain amount of unloading and loading operations, such as those depicted in unloading line 148 and loading line 150, may be tolerated while holding the same RSSLV temperature reference value 90.

Continuing with decision 142 of the unloading control logic, if the unloading operation continues and reaches a point of less than V % load of the temperature loading model 106 of FIG. 6, then the control logic moves to decision block 152. Decision block 152 determines if the current loading point (a, b) arrived by using the current turbine load % as a and the current sensed temperature as b is considered to be on (e.g., within a tolerance of) the unloading line 154 of FIG. 6. If the current loading point (a, b) is not deemed to be on the unloading line 154, then the RSLLV temperature reference value 90 may be held at step 156 and the decision step 152 may be repeated until the point (a, b) returns to the unloading line 154. If decision 152 determines that the unloading is occurring on the unloading line 154 of FIG. 6, then the control logic moves to step 158. In one embodiment, step 158 determines the RSSLV temperature reference value 90 by using the function F (L, V, T, Z) as described in more detail with respect to step 128 above.

In another embodiment, step 158 of the unloading control logic determines the RSLLV temperature reference value 90 by matching the current loading of the unloading line 154 to the ordinate (y-axis) of the turbine loading model 106 and using the RSSLV temperature reference value 90 found on the ordinate. In other words, given the current loading percentage as a, the step 158 may determine b (i.e., the RSSLV temperature reference value 90) such that the point (a, b) falls on the unloading line 154.

The unloading control logic then moves to decision block 160. Decision block 160 determines if the unloading operation has reached a load point U of the temperature loading model 106 of FIG. 6. If the unloading has reached a load point U or has reached a load point less than U, then the MSR second stage reheater 42 is turned off at step 162 by closing the RSSLV 74.

Returning to the trip control block 116, the control block may be used to control shutdown operations when a trip has occurred, for example, during an emergency condition. The tripping operation controlled by the trip control block 116 includes two main steps. The RSHLV 76 is closed at step 140 and the RSLLV 74 is closed at step 162. Steps 140 and 162 effectively turns off the MSR second stage reheater 42 by closing the two valves that may be used to feed steam into the reheater. The trip unloading line 164 of FIG. 6 graphically shows an example of how the RSSLV temperature reference value 90 may fall during a trip operation that may occur at a load point of X. It is to be understood that a trip operation may occur at other values of the abscissa, i.e., load axis, shown in the temperature loading model 106 of FIG. 6.

Returning to the auto shutdown control block 118, the control block may be used when a controlled shutdown of the MSR second stage reheater 42 is to be performed. Instead of immediately turning off the MSR, a load point W, such as the point W depicted in FIG. 6, may be chosen as an intermediate shutdown point. The intermediate shutdown point may be used to reduce temperature differences (and thermal stresses) while shutting down the MSR second stage reheater 42. The auto shutdown control block 118 is, therefore, capable of minimizing unwanted thermal effects by first calculating the slope of a line that would reach point W from the current load point at step 166. Two example shutdown lines 168 and 170 have been calculated and are shown in FIG. 6. Line 168 starts at a load point of X and line 170 starts at a load point close to W. Both lines 168 and 170 end at load point W. In one embodiment, step 166 calculates the RSSLV temperature reference value 90 as the loading moves down a shutdown line such as lines 168 and 170 by using the function F (L, T, V, Z) as described in more detail above with respect to step 128.

In another embodiment, step 166 of the auto shutdown logic calculates the RSSLV temperature reference value 90 by matching the current loading along the appropriate shutdown line (e.g., 168 and 170) to the ordinate (y-axis) of the turbine loading model 106 and using the RSSLV temperature reference value 90 found on the ordinate. In other words, given the current loading percentage as a, the step 166 may determine b (i.e., the RSSLV temperature reference value 90) such that the point (a, b) falls on the appropriate shutdown line. The RSSLV temperature reference value 90 is continuously calculated until the load point W is reached. Decision 172 may then determine if the current turbine load percentage is less than or equal to the W % load. If so, the RSLLV 74 may be closed at step 162 and the MRS second stage reheater 42 may be turned off.

It is to be understood that like points U and X, points V, W, X, Y, and Z may be easily changed through the use of a GUI. Further, the disclosed embodiments not only allow for flexibility in choosing the various loading points, but also allow for the easy creation of a plurality of temperature loading models, such as the example loading model depicted in FIG. 6. Indeed, the methods and apparatuses provided by the disclosed embodiments may be used to drastically increase the performance, efficiency, and safety of a power plant.

Technical effects of the invention include direct, closed-loop control of the desired reheat temperature at each MSR 32 outlet, reduced steam turbine temperature transients that may reduce clearance rubs, reduced side-to-side temperature differences that may reduce vibration, increased coordination between the controllers controlling a plurality of MSRs 32 in a power plant, and the use of a controlled rate of temperature increases and decreases that respect the steam turbine material limitations. Closed-loop control embodiments are employed that allow for the flexible implementation of various temperature loading models as well as for the use of temperature reference functions. The temperature reference functions can incorporate data from a plurality of sensors, including pressure sensors, flow sensors, temperature sensors, valve position sensors, clearance sensors, speed sensors, vibration sensors, or a combination thereof, in order to calculate a safe and efficient temperature reference. The temperature reference may then be used as feedback to control the reheating of steam. Electronic signals rather than pneumatic controls are used, resulting in faster and more reliable control embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system comprising:
   a shaft;
   a main steam source configured to output main steam;
   a high pressure steam turbine configured to:
      receive the main steam from the main steam source; and
      output exhaust steam after using the main steam to rotate the shaft;
   a moisture separator reheater configured to:
      receive the main steam from the main steam source;
      receive the exhaust steam from the high pressure steam turbine; and
      output thermally enhanced steam by using the main steam to heat the exhaust steam;
   a low pressure steam turbine configured to:
      receive the thermally enhanced steam from the moisture separator reheater; and
      rotate the shaft using the thermally enhanced steam; and a controller programmed to:
  determine measured temperature of the thermally enhanced steam; and
  control supply of the main steam to the moisture separator reheater based at least in part on the measured temperature to facilitate substantially smooth linear ramping of temperature of the thermally enhanced steam.

2. The system of claim 1, comprising a temperature sensor communicatively coupled to the controller, wherein the temperature sensor is configured to:
  measure the temperature of the thermally enhanced steam output from the moisture separator reheater; and
  communicate an electronic feedback signal indicating the measured temperature to the controller.

3. The system of claim 1, comprising a plurality of sensors communicatively coupled to the controller, wherein the plurality of sensors is configured to:
  measure a plurality of different measurement parameters; and
  communicate one or more electronic feedback signals indicating each of the plurality of different measurement parameters to the controller.

4. The system of claim 3, wherein the plurality of sensors comprises a temperature sensor, a pressure sensor, a vibration sensor, a valve position sensor, a clearance sensor, a speed sensor, a flow sensor, or a combination thereof.

5. The system of claim 1, comprising a steam valve fluidly coupled to the moisture separator reheater;
  wherein the controller is programmed to control the supply of the main steam to the moisture separator reheater by controlling valve position of the steam valve.

6. The system of claim 5, wherein the controller is programmed to:
  control the valve position based at least in part on the measured temperature and a temperature reference setpoint; and
  ramp the temperature reference setpoint substantially linearly.

7. The system of claim 1, comprising a nuclear reactor, wherein the main steam source comprises a boiler coupled to the nuclear reactor.

8. The system of claim 1, wherein the controller comprises a proportional integral derivative controller.

9. The system of claim 1, comprising:
  a first steam valve fluidly coupled between the high pressure turbine and the moisture separator reheater; and
  a second steam valve fluidly coupled between the main steam source and the moisture separator reheater; wherein:
  the moisture separator reheater comprises:
    a first stage reheater configured to receive an extraction steam extracted from the high pressure steam turbine via the first steam valve; and
    a second stage reheater configured to receive the main steam from the main steam source via the second steam valve; and
  the controller is programmed to control the temperature of the thermally enhanced steam output from the moisture separator reheater by controlling actuation of the first steam valve, the second steam valve, or both.

10. The system of claim 1, wherein the controller is programmed to facilitate substantially smooth linear ramping of the temperature of the thermally enhanced steam output from the moisture separator reheater while the low pressure steam turbine is loading, unloading, shutting down, or any combination thereof.

11. A power plant comprising:
  turbine-generator control system configured to:
    control supply of main steam from a main steam source to a first steam turbine in the power plant;
    control supply of thermally enhanced steam from a moisture separator reheater in the power plant to a second steam turbine in the power plant; and
    control supply of the main steam from the main steam to the moisture separator reheater based at least in part on an electronic feedback signal received from a sensor to facilitate smooth linear ramping of temperature of the thermally enhanced steam output from the moisture separator reheater to the second steam turbine, wherein the sensor is configured to determine a measured temperature at an outlet of the moisture separator reheater, the sensor is configured to indicate the measured temperature using the electronic feedback signal, and the moisture separator reheater is configured to generate the thermally enhanced steam using the main steam.

* * * * *